United States Patent Office 3,426,014
Patented Feb. 4, 1969

3,426,014
BENZODIAZEPINE COMPOUNDS
Josef Schmitt, L'Hay-les-Roses, Val-de-Marne, France, assignor to Etablissements Clin-Byla, Paris, France, a corporation of France
No Drawing. Filed Dec. 29, 1965, Ser. No. 517,434
Claims priority, application France, Jan. 9, 1965, 1,391; Apr. 9, 1965, 12,687
U.S. Cl. 260—239.3                  24 Claims
Int. Cl. C07d 53/06; A67k 27/00

ABSTRACT OF THE DISCLOSURE

This invention relates to compounds of the benzodiazepine series containing a mobile chlorine atom or atoms and to functional derivatives thereof. The compounds have utility as therapeutics and as chemical intermediates.

---

It has been found that when a benzodiazepine having the general formula

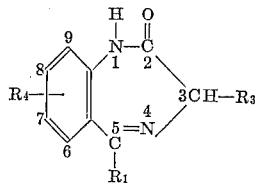

(I)

in which:

$R_1$ is a phenyl, a straight chained or branched alkyl group, an aralkyl or a cycloalkyl group,
$R_3$ is a hydrogen atom or a lower alkyl group and
$R_4$ is a hydrogen or a halogen atom e.g. a chlorine atom, or an alkyl, alkoxy, trifluoromethyl or nitro group, which substituent is in the 6, 7, 8 or 9 position in the benzene ring, especially in the 7 position, is treated with a metal or organic hypochlorite under conditions to be discussed, a product is obtained in which the hydrogen atom attached to the nitrogen atom in position 1 is replaced by a mobile chlorine atom. The chlorine atom undergoes rearrangement by an intramolecular radical reaction onto the carbon atom which, in the group $R_1$, is adjacent to the heterocycle provided this carbon atom carries at least one hydrogen atom. This rearrangement is thus impossible to effect in the case in which $R_1$ is a phenyl group; in that case, however, the N-chloro derivative is more stable.

If two hydrogen atoms are attached to the carbon atom of group $R_1$ which is directly linked to the carbon atom in the 5-position in the diazepine ring, as is the case when $R_1$ is an alkyl or aralkyl group, substitution and rearrangement can be repeated, thus producing dichloro derivatives having both chlorine atoms attached to the same carbon atom. Lastly, if $R_1$ is a methyl group, it is possible by repeating this process a third time to prepare the 5-trichloromethyl derivative.

The chlorination may be carried out either with the aid of a metal hypochlorite such as sodium hypochlorite in a two-phase system comprising water and an organic solvent such as methylene chloride or using an organic hypochlorite such as tertiary-butyl hypochlorite in a homogeneous medium obtained with a suitable solvent such as methylene chloride.

If it is desired to isolate the N-chloro derivative, it is preferable to use the first method and to work at room temperature. When the operation is terminated, the organic layer is separated, the solvent is evaporated without exceeding a temperature of 30 to 35° C. and the residue is crystallised from a suitable solvent such as a hydrocarbon or an ether, care being taken to heat as little as possible.

Rearrangement of the chlorine atom is easily brought about by heating a solution of an N-chloro derivative in a solvent other than a primary or secondary alcohol such as di-isopropyl ether, ethyl acetate or tertiary butyl alcohol under reflux for a time varying from a few minutes to several hours. The progress of the reaction can be followed by means of a test made with a solution of sodium iodide in acetone; under these conditions, the N-chloro derivatives liberate iodine from the iodide, thereby giving rise to a brown colour in the acetone solution, whilst the derivatives in which the position of chlorine has changed do not produce such coloration.

If the reagent used is tertiary-butyl hypochlorite dissolved in methylene chloride, it is difficult to isolate the N-chloro derivatives. A very considerable migration of the chlorine atom is frequently found to have taken place, depending upon the duration of the reaction. Advantage may be taken of this ease of rearrangement when it is desired to obtain mono-, di- or tri-chloro derivatives at the 5-position directly without intermediate isolation of any N-chloro derivative. To achieve this, all that is required is to use larger quantities of the hypochlorite and to increase the time of contact. In most cases, the desired compound precipitates from methylene chloride, the derivatives containing chlorine in the 5-position being generally less soluble in this solvent than the N-chloro compounds from which they are derived. In the case of the 5-trichloromethyl derivatives it is advantageous, in view of the relative difficulty in effecting rearrangement of the third chlorine atom, to complete the reaction by brief heating in solution in ethyl acetate.

The infra red spectra of the N-chloro compounds, determined in solution in methylene chloride (using a UNICAM SP 200 instrument), show, among other things, when compared with their precursors which have a hydrogen atom united to the nitrogen atom, an average hypsochromic displacement of the C=O band of 20 cm.$^{-1}$ (C=O 1680–1690 for the free N—H compounds and 1700–1710 for the N—Cl compounds). Moreover, the N-chloro compounds differ from their precursors by the absence of the N—H band which is present in the latter at 3400 cm.$^{-1}$. The monochloro compounds in which the chlorine has migrated to the 5-position have a C=O band at 1680–1690 cm.$^{-1}$ and an N—H band at 3400 cm.$^{-1}$. As for the dichloro and the trichloro compounds containing the chlorine in the 5-position, they have, inter alia, a C=O band at 1700 cm.$^{-1}$ and an N—H band at 3400 cm.$^{-1}$.

The N-chlorine atom in the N-chloro compounds can easily be liberated by boiling the compounds with an alcohol, for example ethanol, the chlorine formed oxidising a part of the solvent to acetaldehyde. On the other hand, after rearrangement, the chlorine atom shows greater stability, being substantially comparable in its reactivity with that found in a compound such as benzyl chloride. Moreover, this reactivity is sufficiently high for the benzodiazepines which carry a chlorine atom as a substituent in the $R_1$ group in the α-position to the heterocycle to be valuable intermediates for the preparation of new derivatives which constitute one aspect of this invention. Thus:

(1) By removal of one molecule of hydrogen chloride and introduction of a double bond, the monochloro compounds give rise to the corresponding cycloalkenyl and alkenyl derivatives. The process may, for example, be carried out in dimethyl formamide by heating with lithium carbonate in the presence of a small quantity of a lithium halide, for example, the bromide. The reaction is rendered apparent by the evolution of carbon dioxide gas; it thus becomes possible to follow the progress of the reaction and to choose a suitable heating temperature in each case. In practice, it is advantageous to heat to the minimum temperature (80 to 120° C.) required to provide a sufficient evolution of carbon dioxide; too high a temperature reduces the yield. To isolate the product, the mineral salts are separated, the dimethylformamide is evaporated under reduced pressure, the residue diluted with water and the solid which separates dried and recrystallised from a suitable solvent.

In their infra red spectra, these ethylene derivatives show, inter alia, an N—H band at 3400 cm.$^{-1}$, a C=O band at 1690 cm.$^{-1}$ and a band, which is sometimes double, in the region of 1600 cm.$^{-1}$. These ethylene derivatives when subjected to N-chlorination show a C=O band at about 1710 cm.$^{-1}$ and there is absence of an N—H band at 3400 cm.$^{-1}$. When subjected to N-alkylation with a lower alkyl group, e.g. a methyl group, there is a C=O band in the region of 1680 cm.$^{-1}$ and absence of an N—H band at 3400 cm.$^{-1}$. To effect the N-chlorination, the technique described above is used (reaction with metal or organic hypochlorite). The N-alkylation is best carried out in solution in dimethyl formamide using an alkyl halide in the presence of an alkali metal alkoxide such as sodium methylate.

As an example, the course of the reactions which can be carried out on 7-chloro-5-cyclohexyl-2-oxo-2,3-dihydro-1H-benzo[f]diazepine-1,4 are set out below.

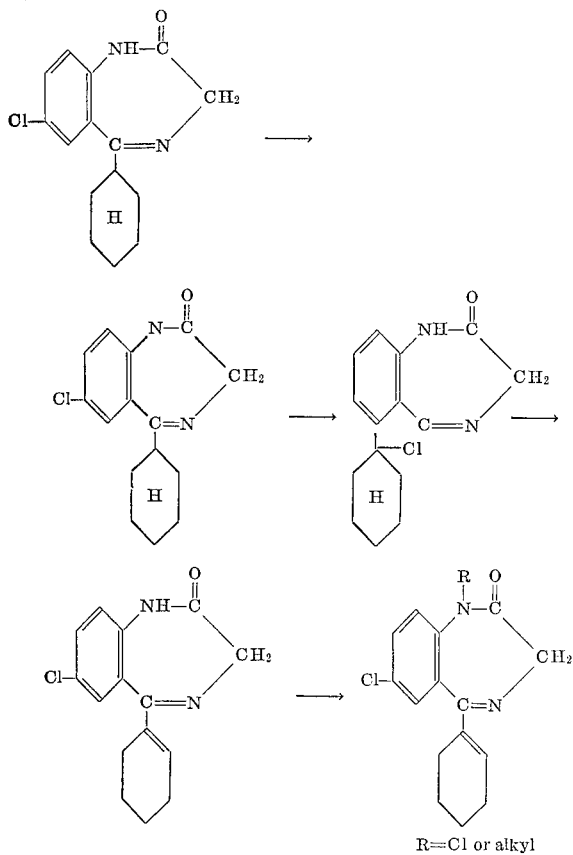

R=Cl or alkyl (2) The action of an amine on the monochloro compounds leads to products which will now be discussed.

When compounds carrying a single chlorine atom are treated with an excess of a primary aliphatic or araliphatic amine or with dimethylamine or with a secondary heterocyclic amine such as pyrrolidine, piperidine, morpholine, N-methylpiperazine or N-hydroxyethyl piperazine and esterification and etherification derivatives of the latter, either without solvent whilst heating upon a water bath or in alcoholic solution at room temperature, varying yields of basic compounds carrying, in place of the chlorine atom, an amino group corresponding to that present in the amine used are obtained.

The infra-red spectra of these amino compounds in methylene chloride show inter alia an N—H band at 3400 cm.$^{-1}$ and a C=O band at 1670–1700 cm.$^{-1}$.

However, if diethylamine or one of its homologues such as dibutylamine is used and if $R_1$ is a 1-chlorocyclohexyl or 1-chlorocyclopentyl group, the reaction follows a different course and for the most part leads to the formation of a double bond accompanied by dehydrohalogenation; the products obtained, which are bright yellow, are isomeric with but not identical with the pale yellow ethylenic compounds prepared from the same monochloro-derivatives by the method described under (1) using lithium carbonate and dimethylformamide.

The structure of the two classes of isomeric compounds has been studied in the case in which the substituent $R_1$ in the parent compounds (4253 CB) from which they are obtained is a 1-chlorocyclohexyl group. In this case, the two isomeric unsaturated compounds (4260 CB and 4386 CB) give on hydrogenation over platinum at room temperature, the same compound, namely 7-chloro-5-cyclohexyl-2-oxo-2,3,4,5-tetrahydro 1H - benzo[f]diazepine-1,4 which is also obtained by reducing, under the same conditions, 7-chloro-5-cyclohexyl-2-oxo-2,3-dihydro 1H-benzo[f]-diazepine-1,4. This shows that the products 4260 CB and 4386 CB both have the benzodiazepine ring and differ only by the position of one or more double bonds. As a result of studying the nuclear magnetic resonance spectra it is possible to indicate that in the compound 4260 CB, the substituent $R_1$ is 1-cyclohexenyl whereas in the compound 4386 CB, $R_1$ is a cyclohexylidene group formed with displacement of the heterocyclic double bond from between the 5 and 4 positions to between the 4 and 3 positions.

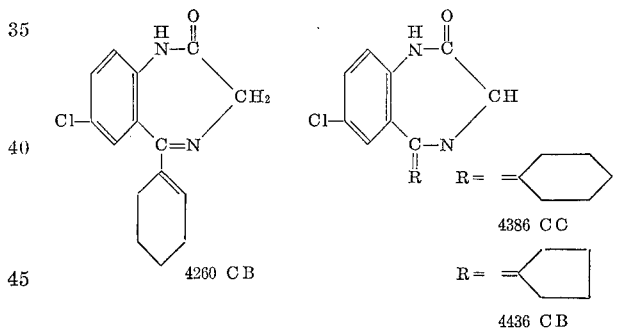

The infra red spectra of the compounds 4386 CB and 4436 CB differ from the spectra of products of the type 4260 CB by the absence of a band in the region of 1600 cm.$^{-1}$; the C=O band is situated at 1670–1680 cm.$^{-1}$ and the N—H band at 3400 cm.$^{-1}$. The ultra-violet spectra in ethanol show in the case of 4386 CB two maxima at 235 m$\mu$ ($\epsilon$=17500) and 368 m$\mu$ ($\epsilon$=800) and in the case of 4260 CB two maxima at 227 m$\mu$ ($\epsilon$=31300) and 312.5 m$\mu$ ($\epsilon$=2300).

If dichloro compounds corresponding to the formula I in which $R_1$ represents a linear aliphatic group having two chlorine atoms in the $\alpha$-position of the heterocycle are treated with an amine such as dimethylamine or pyrrolidine under conditions analogous to those used for the monochloro products, each of the two halogen atoms is replaced by an amine residue. The diamino derivatives thereby obtained, which are unstable, have been isolated in the case in which $R_1$ is —CHCl$_2$. In general, they spontaneously lose a molecule of amine and give rise to unsaturated amines; in these unsaturated amines, the position of the double bond has not been established with certainty. However, these unsaturated amines have a striking resemblance to each other both in their ultra violet spectra in ethanol which show, inter alia, two maxima, one at 263–265 m$\mu$ ($\epsilon$=16,000 to 16,800) and the other at 227–228 m$\mu$ ($\epsilon$=22,600 to 22,800) and in their infra red spectra which show, in particular, a very intense and constant band at 1580 cm.$^{-1}$. These amines are obtained no matter what the α,α-dichloro-alkyl group $R_1$ is, including the case in which $R_1$ is $CHCl_2$.

(3) Treatment of the monochloro compounds with an alkali metal cyanide in a solvent such as ethanol under reflux readily leads to derivatives in which the chlorine atom is replaced by a cyano group. These products, such as 4431 and 4432 CB, have the particular characteristic of giving an infra red spectrum in which the C≡ band in the region of 2250 cm.$^{-1}$ is almost absent.

Table 1 which follows shows a number of compounds which illustrate the invention.

TABLE 1

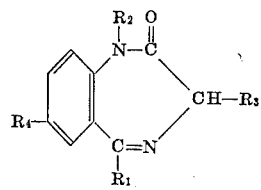

| No. CB | $R_1$ | $R_2$ | $R_3$ | $R_4$ |
| --- | --- | --- | --- | --- |
| 4254 | $C_6H_5$ | Cl | H | Cl |
| 4289 | $C_6H_5$ | Cl | $CH_3$ | Cl |
| 4252 | cyclohexyl- | Cl | H | Cl |
| 4253 | cyclohexyl-Cl | H | H | Cl |
| 4427 | cyclohexyl-Cl | H | H | $NO_2$ |
| 4418 | cyclopentyl-Cl | H | H | Cl |
| 4419 | $H_3C$—CHCl— | H | H | Cl |
| 4420 | $H_3C$—$CH_2$—$CH_2$—CHCl | H | H | Cl |
| 4421 | $H_3C$—$CH_2$—C(Cl)($CH_3$) | H | H | Cl |
| 4265 | cyclohexyl-Cl | Cl | H | Cl |
| 4425 | $Cl_2$—CH— | H | H | Cl |
| 4393 | $H_3C$—$CCl_2$— | H | H | Cl |
| 4391 | $H_3C$—$CH_2$—$CH_2$—$CCl_2$ | H | H | Cl |
| 4426 | $Cl_3C$— | H | H | Cl |
| 4269 | cyclohexenyl- | H | H | Cl |
| 4416 | cyclohexenyl- | H | H | $NO_2$ |
| 4310 | cyclopentenyl- | H | H | Cl |
| 4422 | $H_3C$—CH=C—$CH_3$ | H | H | Cl |
| 4261 | cyclohexenyl- | $H_3C$ | H | Cl |
| 4423 | cyclopentenyl- | $H_3C$ | H | Cl |
| 4424 | cyclohexenyl- | Cl | H | Cl |
| 4267 | cyclohexenyl-NH—$CH_3$ | H | H | Cl |
| 4268 | cyclohexenyl-N($CH_3$)$_2$ | H | H | Cl |

TABLE 1—Continued

| No. CB | R₁ | R₂ | R₃ | R₄ |
|---|---|---|---|---|
| 4274 | cyclohexyl-C(CH₃)-N(pyrrolidinyl) | H | H | Cl |
| 4380 | cyclohexyl-C(CH₃)-N(morpholinyl) | H | H | Cl |
| 4379 | cyclohexyl-C(CH₃)-N(N-CH₃ piperazinyl) | H | H | Cl |
| 4458 | cyclohexyl-C(CH₃)-N(piperidinyl)-CH₂-CH₂-OH | H | H | Cl |
| 4402 | cyclohexyl-C(CH₃)-N(piperidinyl) | H | H | Cl |
| 4381 | cyclohexyl-C(CH₃)-NH-CH(CH₃)-CH₂-phenyl | H | H | Cl |
| 4403 | cyclohexyl-C(CH₃)-NH-cyclopropyl | H | H | Cl |
| 4428 | cyclopentyl-C(CH₃)-N(CH₃)₂ | H | H | Cl |
| 4280 | (H₃C)₂N—CH—CH₂—CH₂—CH₃ | H | H | Cl |
| 4281 | pyrrolidinyl-N—CH—CH₂—CH₂—CH₃ | H | H | Cl |
| 4429 | pyrrolidinyl-N—C(CH₃)—CH₂—CH₃ | H | H | Cl |
| 4434 | (H₃C)₂N—CH—N—(CH₃)₂ | H | H | Cl |
| 4433 | pyrrolidinyl-N—CH—N(pyrrolidinyl) | H | H | Cl |
| 4431 | cyclohexyl-C(CH₃)-C≡N | H | H | Cl |
| 4432 | cyclopentyl-C(CH₃)-C≡N | H | H | Cl |

The following examples illustrate the invention; M.P.$_k$ indicates the melting point measured on a Kofler bench.

Example 1.—1,7-dichloro-5-phenyl-2-oxo-2,3-dihydro 1H-benzo[f]diazepine-1,4 (4254 CB)

(A) Process using sodium hypochlorite.—40 ml. of a solution of sodium hypochlorite of 14.5 British chlorometric degrees are added to a suspension of 5.4 g. of 7-chloro-5-phenyl-2-oxo - 2,3 - dihydro 1H-benzo[f]diazepine-1,4 in 80 ml. of methylene chloride. The mixture is stirred at room temperature for 15 minutes; the solid dissolves rapidly. The organic layer is decanted, washed with water, dried over anhydrous sodium sulphate and the solvent evaporated under reduced pressure without exceeding a temperature of 30° C. The residue is taken up in a little di-isopropyl ether and the crystals which form are dried. They are recrystallised as rapidly as possible from ethyl acetate. Colourless crystals (3.9 g.; yield 64%); M.P.$_k$=143–144° C. with decomposition.

(B) Process using tertiary-butyl hypochlorite.—1.2 g. of tertiary butyl hypochlorite are added to a suspension of 2.7 g. of 7-chloro-5-phenyl-2-oxo-2,3-dihydro 1H-benzo[f]diazepine-1,4 in 20 ml. of methylene chloride and the mixture is stirred and at the same time cooled in a water bath for 30 minutes. The solid dissolves in about 15 minutes. The product is evaporated to dryness under reduced pressure at a temperature below 40° C. The residue is taken up in di-isopropyl ether and the crystals which separate are dried. Colourless crystals are obtained (2.8 g.; yield 91%); M.P.$_k$=143–144° C. with decomposition.

Example 2.—1,7-dichloro-3-methyl-5-phenyl-2-oxo-2,3-dihydro 1H-benzo[f]diazepine-1,4 (4289 CB)

The process is carried out as described in Example 1A but the 7-chloro-5-phenyl-2-oxo-2,3-dihydro 1H-benzo[f]diazepine-1,4 is replaced by an equimolecular quantity of 7-chloro-3-methyl-5-phenyl - 2 - oxo - 2,3 - dihydro 1H-benzo[f]diazepine-1,4. The product is obtained as colourless crystals from benzene; M.P.$_k$=185° C. (with decomposition). Yield 58%.

Example 3.—1,7dichloro-5-cyclohexyl-2-oxo-2,3-dihydro 1H-benzo[f]diazepine-1,4 (4252 CB)

(A) Process using sodium hypochlorite.—The process described in Example 1 is repeated the 7-chloro-5-phenyl-2-oxo-2,3-dihydro 1H-benzo[f]diazepine-1,4 being replaced by an equimolar quantity of 7-chloro-5-cyclohexyl-2-oxo-2,3-dihydro 1H-benzo[f]diazepine-1,4.

The colourless crystals are isolated in the same manner and recrystallised from ethyl acetate. M.P.$_k$=163° C. (with decomposition). Yield 85%.

(B) Process using tertiary-butyl hypochlorite.—The process described in Example 1B is repeated the 7-chloro-5-phenyl-2-oxo-2,3-dihydro 1H-benzo[f]diazepine-1,4 being replaced by an equimolecular quantity of 7-chloro-5-cyclohexyl-2-oxo-2,3-dihydro 1H-benzo[f]diazepine-1,4. The colourless crystals are isolated without recrystallisation. M.P.$_k$=161–162° C. (with decomposition). Yield 98%.

Example 4.—7-chloro-5-(1'-chlorocyclohexyl)-2-oxo-2,3-dihydro 1H-benzo[f]diazepine-1,4 (4253 CB)

A solution of 117 g. of the compound produced as described in Example 3 in 450 ml. ethyl acetate is heated under reflux until a precipitate begins to form. From then onwards reflux is continued until a negative reaction is obtained when the reaction mixture is tested with a solution of sodium iodide in acetone. The reaction mixture is left to cool and the solid which separates is dried. Colourless crystals (76 g.) are obtained. M.P.$_k$=194–195° C. (with decomposition). A second portion (14 g.) is isolated by concentrating the mother liquor. M.P.$_k$=194–195° C. (with decomposition). The total yield is 77%. The melting point is raised to 196–197° C. by recrystallisation from ethyl acetate.

Example 5.—7-chloro-5-(1'-chlorocyclopentyl)-2-oxo-2,3-dihydro 1H-benzo[f]diazepine-1,4 (4418 CB)

Employing the procedure described in Example 1A, 31.5 g. of 7-chloro-5-cyclopentyl-2-oxo-2,3-dihydro 1H-benzo[f]diazepine-1,4 dissolved in 480 ml. of methylene chloride are treated with 240 ml. of sodium hypochlorite solution of 14.5 British chlorometric degrees.

The oily product thus obtained is dissolved in 250 ml. of di-isopropyl ether and heated under reflux until a negative reaction is obtained when tested with a solution of sodium iodide in acetone. The reaction mixture is left to cool and the colourless crystals which separate are dried (25 g.; yield 70%). M.P.$_k$=191° C. (with decomposition).

Example 6.—7-nitro-5-(1'-chlorocyclohexyl)-2-oxo-2,3-dihydro 1H-benzo[f]diazepine-1,4 (4427 CB)

The procedure described in Example 5 is employed, 7-chloro-5-cyclopentyl-2-oxo-2,3-dihydro 1H-benzo[f]diazepine-1,4 being replaced by an equimolecular quantity of 7-nitro-5-cyclohexyl-2-oxo-2,3-dihydro 1H-benzo[f]diazepine-1,4. The product is obtained as yellowish crystals from xylene. M.P.$_k$=247° C. Yield 87%.

Example 7.—7-chloro-5-(1'-chloroethyl)-2-oxo-2,3-dihydro 1H-benzo[f]diazepine-1,4 (4419 CB)

(A) Using sodium hypochlorite.—The process is carried out as described in Example 5, 7-chloro-5-cyclopentyl-2-oxo-2,3-dihydro 1H-benzo[f]diazepine-1,4 being replaced by an equimolar quantity of 7-chloro-5-ethyl-2-oxo-2,3-dihydro 1H-benzo[f]diazipen-1,4. The product is obtained as yellowish crystals from ethyl acetate. M.P.$_k$=197° C. (with decomposition). Yield 20%.

(B) Using tertiary butyl hypochlorite.—A suspension of 2.35 g. of 7-chloro-5-ethyl-2-oxo-2,3-dihydro 1H-benzo[f]diazepine-1,4 in 20 ml. of methylene chloride is stirred at room temperature for one hour with 1.2 g. of tertiary butyl hypochlorite. The solid dissolves rapidly and, after a few minutes, a colourless solid starts to precipitate. The reaction mixture is evaporated to dryness under reduced pressure at a temperature not exceeding 30° C. The residue is crystallised from ethyl acetate and is obtained as yellowish crystals (1.6 g.; yield 61%). M.P.$_k$=197° C. (with decompositions).

Example 8.—7-chloro-5-(1'-chlorobutyl)-2-oxo-2,3-dihydro 1H-benzo[f]diazepine-1,4 (4420 CB)

(A) Using sodium hypochlorite.—The procedure described in Example 5 is used, 7-chloro-5-cyclopentyl-2-oxo-2,3-dihydro 1H-benzo[f]diazepine-1,4 being replaced by an equimolecular quantity of 7-chloro-5-butyl-2-oxo-2,3-dihydro 1H-benzo[f]diazepine-1,4. To effect the transposition, the di-isopropyl ether is replaced by an equal volume of ethyl acetate. The product is obtained as colourless crystals from di-isopropyl ether. M.P.$_k$=128–129° C. (with decomposition). Yield 67%.

(B) Using tertiary-butyl hypochlorite.—The procedure described in Example 7B is used, 7-chloro-5-ethyl-2-oxo-2,3-dihydro 1H-benzo[f]diazepine-1,4 being replaced by an equimolecular quantity of 7-chloro-5-butyl-2-oxo-2,3-dihydro 1H-benzo[f]diazepine-1,4. The product is obtained as colourless crystals from di-isopropyl ether. M.P.$_k$=128–129° C. (with decomposition). Yield 81%.

Example 9.—7-chloro-5-(1'-chloro-1'-methyl-propyl)-2-oxo-2,3-dihydro 1H-benzo[f]diazepine-1,4 (4421 CB)

Employing the procedure described in Example 1B, 7-chloro-5-(1'-methyl-propyl)-2-oxo-2,3-dihydro 1H-benzo[f]diazepine-1,4 is treated wtih tertiary-butyl hypochlorite. The oily residue is taken up in di-isopropyl ether (8 volumes) and heated under reflux for 30 minutes. The solvent is evaporated under reduced pressure and the residue is crystallised from di-isopropyl ether. It is obtained as colourless crystals. M.P.$_k$=141° C. Yield 50%.

Example 10.—1,7-dichloro-5-(1'-chloro-cyclohexyl)-2-oxo-2,3-dihydro 1H-benzo[f]diazepine-1,4 (4265 CB)

The process described in Example 1A is repeated, the 7-chloro-5-phenyl-2-oxo-2,3-dihydro 1H-benzo[f]diazepine-1,4 being replaced by an equimolecular quantity of 7-chloro-5-(1-chlorocyclohexyl)-2-oxo-2,3-dihydro 1H-benzo[f]diazepine-1,4. The product is obtained as yellowish crystals from di-isopropyl ether. M.P.$_k$=102° C. Yield 62%.

Example 11.—7-chloro-5-dichloromethyl-2-oxo-2,3-dihydro 1H-benzo[f]diazepine-1,4 (4425 CB)

A suspension of 8.3 g. of 7-chloro-5-methyl-2-oxo-2,3-dihydro 1H-benzo[f]diazepine-1,4 in 80 ml. of methylene chloride is stirred at room temperature with 9.6 g. of tertiary-butyl hypochlorite.

The product dissolves with evolution of heat and after about 1 hour, as a rule, heat is again evolved followed by a precipitation of crystals. The reaction mixture is stirred for a further one hour and then evaporated to dryness under reduced pressure at a temperature of 30° C. Di-isopropyl ether is added to the residue and the whole is heated to boiling for several minutes, and then cooled. The crystals which separate are dried and recrystallised from ethanol. The product is obtained as yellow crystals (6.2 g.; yield 56%). M.P.$_k$=210° C. (with decomposition).

Example 12.—7-chloro-5-(1',1'-dichloro-ethyl)-2-oxo-2,3-dihydro 1H-benzo[f]diazepine-1,4 (4393 CB)

The procedure described in Example 11 is repeated, 7-chloro-5-methyl-2-oxo-2,3-dihydro 1H-benzo[f]diazepine-1,4 being replaced by an equimolecular quantity of 7-chloro-5-ethyl-2-oxo-2,3-dihydro 1H-benzo[f]diazepine-1,4. The product recrystallised from methanol is obtained as yellowish crystals and has a double melting point M.P.$_k$ 160° C. (followed by resolidification and M.P.$_k$=190° C. (with decomposition). Yield 73%.

Example 13.—7-chloro-5(1',1'-dichloro-butyl)-2-oxo-2,3-dihydro 1H-benzo[f]diazepine1,4 (4391 CB)

(A) Starting from 7-chloro-5-(1'-chlorobutyl)-2-oxo-2,3-dihydro 1H-benzo[f]diazepine-1,4.—The process described in Example 5 is repeated, 7-chloro-5-cyclopentyl-2-oxo-2,3-dihydro 1H-benzo[f]diazepine-1,4 being replaced by equimolar quantity of the 5-(1'-chlorobutyl) compound. The product recrystallised from ethyl acetate, is obtained as yellowish crystals. M.P.$_k$=208° C. Yield 50%.

(B) Starting from 7-chloro-5-butyl-2-oxo-2,3-dihydro 1H-benzo[f]diazepine-1,4.—The process described in Example 11 as repeated, the 7-chloro-5-methyl-2-oxo-2,3-dihydro 1H-benzo[f]diazepine-1,4 being replaced by an equimolar quantity of 7-chloro-5-butyl-2-oxo-2,3-dihydro 1H-benzo[f]diazepine-1,4. The product recrystallised from ethyl acetate, is obtaind as yellowish crystals. M.P.$_k$=208° C. Yield 78%.

Example 14.—7-chloro-5-trichloromethyl-2-oxo-2,3-dihydro 1H-benzo[f]diazepine-1,4 (4426 CB)

A suspension of 8.3 g. of 7-chloro-5-methyl-2-oxo-2,3-dihydro 1H-benzo[f]diazepine-1,4 in 80 ml. of methylene chloride is stirred at room temperature for 3 hours with 19.2 g. of tertiary-butyl hypochlorite. The solid dissolves with evolution of heat. When the reaction is complete, the reaction mixture is evaporated to dryness under reduced pressure at 30° C. The solid residue is dissolved in ethyl acetate and heated under reflux for 10 minutes. On allowing to cool crystals separate. They are dried and recrystallised from methanol. The product is obtained as white, matted crystals (3.5 g.). M.P.$_k$=185° C. (with decomposition).

A second portion (1.5 g.) is obtained on evaporating the mother liquor. M.P.$_k$ identical. Yield 40%.

Example 15.—7-chloro-5-(1'-cyclohexenyl)-2-oxo-2,3-dihydro 1H-(benzo[f]diazepine-1,4 (4260 CB)

68 g. of 7-chloro-5-(1'-chlorocyclohexyl)-2-oxo-2,3-dihydro 1H-benzo[f]-diazepine-1,4, 34 g. of lithium carbonate and 17 g. of lithium bromide and 340 ml. of anhydrous dimethyl formamide are placed in a three necked flask equipped with a mechanical stirrer, immersion thermometer and a reflux condenser connected with a bubble counter.

The reaction mixture is gradually heated, with stirring, until evolution of carbon dioxide commences (about 100° C.) and the temperature is maintained thereat until the reaction ceases. The temperature is then raised to 110° C. and held thereat for 15 minutes.

The reaction mixture is allowed to cool and the mineral salts separated and dried. The solvent is evaporated under reduced pressure and the residue dissolved in water. It is allowed to crystallise, dehydrated, dried and then recrystallised from ethyl acetate. The product is yellowish crystals (47.5 g.; yield 80%); M.P.$_k$=207–208° C.

Example 16.—7-nitro-5-(1'-cyclohexenyl)-2-oxo-2,3-dihydro 1H-benzo[f]diazepine-1,4 (4416 CB)

The method described in Example 15 is repeated, the compound obtained in Example 4 being replaced by an equimolar quantity of the compound obtained in Example 6. The product is obtained as yellow crystals M.P.$_k$=254° C. from ethyl acetate. Yield 70%.

Example 17.—7-chloro-5-(1'-cyclopentenyl)-2-oxo-2,3-dihydro 1H-benzo[f]diazepine-1,4 (4310 CB)

The process described in Example 15 is repeated, the compound obtained in Example 4 being replaced by an equimolar quantity of the compound obtained in Example 5. The product is obtained as yellow crystals. M.P.$_k$=204–205° C. from ethyl acetate. Yield 38%.

Example 18.—7-chloro-5-(1'-methyl-1'-propenyl)-2-oxo-2,3-dihydro 1H-benzo[f]diazepine-1,4 (4422 CB)

The process described in Example 15 is repeated, the compound obtained in Example 4 being replaced by the stoichiometric quantity of the compound obtained in Example 9. The product is obtained as light yellow crystals. M.P.$_k$=168° C. from isopropyl ether. Yield 30%.

Example 19.—7-chloro-5-(1'-cyclohexenyl)-1-methyl-2-oxo-2,3-dihydro 1H-benzo[f]diazepine-1,4 (4261 CB)

9.7 g. of sodium methylate are added to a solution of 16.5 g. of the compound obtained in Example 15 dissolved in 120 ml. of dry dimethylformamide and the mixture stirred for one half hour. The reaction mixture is cooled in a water bath and a solution of 33.8 g. of methyl iodide dissolved in 35 ml. of anhydrous dimethylformamide is then slowly added with stirring. The solution becomes dark brown in colour and a precipitate forms. It is stirred for 2 hours, then diluted with a large volume of water and extracted with ethyl acetate. The ethyl acetate solution is washed with water, dried over anhydrous sodium sulphate and the solvent evaporated under reduced pressure. The residue is crystallised from a small volume of ethyl acetate. Brownish yellow crystals (9 g.; yield 52%) are obtained. M.P.$_k$=144° C.

Example 20.—7-chloro-5-(1'-cyclopentenyl)-1-methyl-2-oxo-2,3-dihydro 1H-benzo[f]diazepine-1,4 (4423 CB)

The process described in Example 19 is repeated, the compound obtained in Example 15 being replaced by an equimolar quantity of the compound obtained in Example 17. Brownish yellow crystals are obtained on recrystallising from isopropyl ether. M.P.$_k$=150° C. Yield 50%.

Example 21.—1,7-dichloro - 5 - (1'-cyclohexenyl)-2-oxo-2,3-dihydro 1H-benzo[f]diazepine-1,4 (4424 CB)

The process described in Example 1A is repeated, 7-chloro-5-phenyl-2-oxo-2,3-dihydro 1H-benzo[f]diazepine-1,4 being replaced by an equimolar quantity of the compound obtained in Example 15. Colourless crystals are obtained on recrystallising from isopropyl ether. M.P.$_k$=134° C. Yield 56%.

Example 22.—7-chloro-5-[1'-(4'''-methyl-1''-piperazinyl)-cyclohexyl]-2-oxo-2,3-dihydro 1H - benzo[f]diazepine-1,4 (4379 CB). Method A of Table 2

5 g. of the compound obtained in Example 4 and 5 ml. of 4-methylpiperazine are heated for several minutes on a water bath with stirring. The solid dissolves rapidly giving rise to a yellow-brown solution. After cooling, water and di-isopropyl ether are added. A colourless solid separates which is dried, washed and recrystallised from ethyl acetate. Colourless crystals are obtained. (5 g.; yield 83%); M.P.$_k$=240° C.

Example 23.—7-chloro-5-(1'-dimethylamino-cyclohexyl)-2 - oxo - 2,3 - dihydro 1H-benzo[f]diazepine-1,4 (4268 CB). Method B of Table 2

5 g. of the compound obtained in Example 4 admixed with 50 ml. of a 20% solution of dimethylamine dissolved in anhydrous methanol are stirred at room temperature. The solid rapidly dissolves. It is allowed to stand overnight. A colourless solid gradually separates which is dried, washed with a little methanol and recrystallised from absolute ethyl alcohol. Colourless crystals are obtained (3 g.; yield 58%); M.P.$_k$=222° C.

Example 24.—7 - chloro-5-(bis-dimethylaminomethyl)-2-oxo-2,3-dihydro 1H-benzo[f]diazepine-1,4 (4434 CB). Method C of Table 2

15 ml. of a 10% solution of dimethylamine in ether are added, with stirring, to a suspension of 1.4 g. of the product of Example 11 powdered in 30 ml. of anhydrous diisopropyl ether. Heat is liberated and is accompanied by formation of a precipitate. After 2 hours the product is evaporated to dryness under reduced pressure at room temperature and the residue is dissolved in water and ether. Colourless crystals separate. They are recrystallised twice from ethyl acetate. Colourless crystals are obtained (0.15 g.; yield 10%); M.P.$_k$=188° C. (with decomposition).

Example 25.—7 - chloro - 5 - [1'-(1''-pyrolidinyl)-butylidene]-2-oxo - 1,2 - dihydro 5H - benzo[f]diazepine-1,4 (4385 CB). Method D of Table 2

5 g. of the product of Example 13 are stirred at room temperature with 7 g. of pyrrolidine in 50 ml. of anhydrous methanol. Intense liberation of heat ensues with dissolution of the solid. The reaction mixture is allowed to stand for 12 hours. At the end of about one hour, a colourless solid begins to separate. The solid is separated, dried, washed with methanol and recrystallised from absolute ethyl alcohol. Colourless crystals are obtained (3.5 g.; yield 70%); M.P.$_k$=241° C.

Example 26.—7-chloro - 5 - (1-cyano-cyclohexyl)-2-oxo-2,3 - dihydro 1H - benzo[f]diazepine - 1,4 (4431 CB). Method E of Table 2

4 g. of the compound obtained in Example 4 and 1 g. of potassium cyanide dissolved in 150 ml. of anhydrous methanol are heated under reflux for 2 hours. The solid gradually dissolves to give a brown solution.

The solvent is evaporated under reduced pressure on a water bath. The residue is taken up in a mixture of water and ether. The ethereal layer is separated, washed with water, dried over anhydrous sodium sulphate and the ether evaporated on a water bath under reduced pressure. The solid residue is recrystallised from methanol. M.P.$_k$= 236° C. (microscopically). Yield 50%.

Example 27.—7-chloro-5-cyclohexylidene-2-oxo-1,2-dihydro 5H-benzo[f]diazepine-1,4 (4386 CB). Method F of Table 2

20 g. of the compound obtained in Example 4 and 75 ml. of diethylamine are stirred at room temperature. The solid rapidly dissolves to give a yellow solution whilst the temperature spontaneously rises to about 40° C. The reaction product is then left for 2 hours. Excess diethylamine is then evaporated off at ordinary temperature under reduced pressure. The residue is taken up in a dilute solution of sodium carbonate in ether. The solid which crystallises is dried and washed with water and ether.

After recrystallisation from acetone, yellow crystals are obtained (10 g.; yield 57%); M.P.$_k$=218° C.

Other products synthesised by processes A, B, C, D, E, and F described in Examples 22 to 27. The properties of the products obtained are summarised in Table 2.

(A) Action on the central nervous system.—The compounds were administered in varying doses to groups of 10 animals (rats or mice) which were then subjected to tests to demonstrate the activity of the compounds on the central nervous system. The responses to the different tests carried out on the groups of animals treated were in each case compared with those obtained on groups of control animals.

The following tests were used:

Traction (mice) which demonstrates the relaxing effect on striated muscle.
Rotating rod (mice) which demonstrates the effect on equilibration.
Exploration (mice) which appeals to the natural curiosity of mice.
Spontaneous aktography (mice) and spontaneous motor activity (rats), by means of which it is possible to demonstrate the action of the products on the psycho-motor sphere, mice normally having very high mobility whereas rats manifest little displacement.

Combativity (rats).—This test consists in rendering two male rats aggressive towards each other by the passage of an electric current of adjustable voltage through the floor of the cage in which the rats are placed.

Electric shock (mice).—By adjusting the voltage and the amperage of the current used, it is possible to predetermine the percentage of animals treated and protected when compared with control animals.

Convulsions induced by Pentetrazole (mice).—Pentetrazole injected intraperitoneally in mice in a dose of 100 to 125 mg./kg. body weight determines the violent and fatal convulsive crises that can be counteracted by compounds having anticonvulsant activity.

The results obtained are grouped in Table 3 in which the figures preceded by the sign (—) express the percentage inhibition compare with the groups of control animals; P indicates the protection in percent. The doses are expressed in milligrams per kg. of animal body weight. The route of administration was in all cases oral.

Investigation of the results shows that on the whole, all these compounds exert one or more actions on the central nervous system, but in more or less large doses.

(1) Amongst the N-chloro compounds, 4254 CB exerts a marked myorelaxant activity; it disequilibrates a high proportion of animals from a dose of 5 mg./kg. upwards given orally, as do numerous neuroleptics and tranquillisers. It diminishes the spontaneous activity of mice and produces marked withdrawal of interest from the environment (exploration); lastly, it has distinct anticonvulsant

TABLE 2

| N°. CB | Method | Properties |
|---|---|---|
| 4267 CB | B | Yellowish crystals, M.P.$_k$=244° C. (methanol). Acid maleate, M.P.$_k$=203° C. (isopropanol). |
| 4268 CB | B | See Example 23. Colourless crystals, M.P.$_k$=222° C. (ethanol). |
| 4274 CB | B | Colourless crystals, M.P.$_k$=240° C. (ethyl acetate). |
| 4380 CB | A | Colourless crystals, M.P.$_k$=228° C. (ethyl acetate). |
| 4379 CB | A | See Example 22. Colourless crystals, M.P.$_k$=240° C. (ethyl acetate). |
| 4458 CB | A | Colourless crystals, M.P.$_k$=205–206° C. (ethyl acetate). |
| 4402 CB | A | Yellowish crystals, M.P.$_k$=143–5° C. dec. (ether). |
| 4381 CB | A | Colourless crystals, M.P.$_k$=176° C. (ethyl acetate). |
| 4403 CB | A | Colourless crystals, M.P.$_k$=204° C. (ethyl acetate). |
| 4428 CB | B | Colourless platelets, M.P.$_k$=212° C. (ethyl acetate). |
| 4280 CB | B | Colourless platelets, M.P.$_k$=187° C. (ethyl acetate). |
| 4281 CB | B | Colourless crystals, M.P.$_k$=207° C. (ethanol). |
| 4429 CB | B | Yellowish crystals, M.P.$_k$=211° C. (ethyl acetate). |
| 4434 CB | C | See Example 24. Colourless crystals, M.P.$_k$=188° C. (ethyl acetate). |
| 4433 CB | C | Colourless crystals, M.P.$_k$=208° C. (acetone). |
| 4431 CB | E | See Example 26. Yellow crystals, M.P.$_k$=236° C. (microscopically) (methanol). |
| 4432 CB | E | Yellow crystals, M.P.$_k$=246–8° C. (isopropanol). |
| 4376 CB | F | See Example 27. Yellow crystals, M.P.$_k$=218° C. (acetone). |
| 4436 CB | F | Yellow crystals, M.P.$_k$=212° C. (ethyl acetate). |

The various compounds described were subjected to tests designed to investigate their physiological properties. properties both in response to electric shock and with regard to convulsions induced by pentetrazole.

The substitution of a methyl group at $R_3$ (4289 CB) does not significantly modify the properties of 4254 CB.

Replacement of the phenyl group by a cyclohexyl group at $R_1$ diminishes the cativity in most of the tests and in particular in the tests for anticonvulsant properties.

(2) In the C-chloro compounds, a generally low activity is noted in all the tests compared with the compounds of the preceding group.

(3) In the compounds having a double bond in the $R_1$ substituent in the α-position with respect to the 5-carbon atom of the diazepine ring, a new feature becomes apparent, namely the preponderance of the myorelaxant activity compared with the other activities which are substantially reduced, and in particular the anticonvulsant activity which is practically nil at small dosages.

By virtue of this special myorelaxant quality it is possible to envisage special thereapeutic applications, in particular the treatment of myalgia. Replacement of chlorine at $R_4$ by a nitro group reinforces the activity. The introduction of a methyl group at $R_2$ appears to increase the activity slightly.

Lastly, the replacement of the cyclohexenyl group at $R_1$ by the cyclopentenyl group diminishes the activity.

(4) In the group of compounds having an amine residue at $R_1$, the activity on the central nervous system is reduced and the sedative and anticonvulsant properties diminish.

In this series, only 4379 CB exerts a sufficiently marked myorelaxant effect and acts on the psycho-motor centres, diminishing the spontaneous displacements in mice, but the anticonvulsant property is lessened.

TABLE 3.—PHARMACODYNAMIC ACTIONS ON THE CENTRAL NERVOUS SYSTEM

[Doses expressed in mg./kg. administered orally]

| No. of compound | Traction (mice) | | Rotating rod (mice) | | Spontaneous aktography (mice) | | Spontaneous motor activity (rats) | | Combativeness (rats) | | Electric shock (mice) | | Pentetrazole (mice) | | Exploration (mice) | |
|---|---|---|---|---|---|---|---|---|---|---|---|---|---|---|---|---|
| | Dose | Effect | D | E | D | E | D | E | D | E | D | E | D | E | D | E |
| 4254 | 2.5 | −50 | 2.5 | −10 | | | 50 | −63 | 50 | 0 | 2.5 | P 20 | 2.5 | P 80 | 2.5 | −35 |
| | 5 | −80 | 5 | −60 | | | | | 100 | 0 | 5 | P 10 | 5 | P 90 | 5 | −40 |
| | | | | | | | | | | | 10 | P 40 | 10 | P 90 | 10 | −50 |
| | | | | | | | | | | | 25 | P 45 | | | | |
| | | | | | | | | | | | 50 | P 50 | | | | |
| 4289 | 2.5 | −20 | 2.5 | 0 | 20 | 0 | 10 | N.S. | 50 | 0 | 100 | P 10 | 25 | P 0 | 5 | −45 |
| | 5 | −70 | 5 | −10 | | | 25 | 80 | 100 | 0 | | | 50 | P 0 | 10 | −57 |
| | 10 | −40 | 10 | −40 | | | | | | | | | | | 50 | −61 |
| | 20 | −90 | 20 | −40 | | | | | | | | | | | 100 | −100 |
| 4252 | 10 | −60 | 10 | 0 | | | 100 | 0 | 50 | 0 | 5 | P 10 | 5 | 0 | 5 | −20 |
| | 25 | −60 | 25 | −10 | | | | | 100 | 0 | 10 | P 20 | 10 | 0 | 10 | −16 |
| | 50 | −100 | 50 | −30 | | | | | | | | | | | | |
| | 100 | −100 | 100 | −20 | | | | | | | | | | | | |
| 4253 | | | | | | | | | | | 25 | 0 | 10 | 0 | 50 | 0 |
| | 100 | 0 | 100 | 0 | | | | | | | 50 | 0 | 20 | 0 | 100 | 0 |
| | | | | | | | | | | | 75 | P 40 | 50 | 0 | | |
| | | | | | | | | | | | 100 | P 60 | 100 | 0 | | |
| 4265 | 50 | 0 | 50 | 0 | 100 | 0 | 100 | 0 | 50 | 0 | 50 | P 20 | 50 | P 20 | 50 | 0 |
| | 100 | 0 | 100 | 0 | | | | | 100 | 0 | 100 | P 20 | 100 | P 20 | 100 | 0 |
| 4393 | 5 | −40 | 5 | 0 | 20 | 0 | | | | | 5 | 0 | 5 | 0 | 5 | 0 |
| | 10 | −50 | 10 | −30 | | | | | | | 10 | 0 | 10 | 0 | 10 | −18 |
| 4391 | 5 | −40 | 5 | −20 | 10 | 0 | | | | | 10 | 0 | | | 5 | −19 |
| | 10 | −50 | 10 | −20 | 20 | −43 | | | | | | | | | 10 | −29 |
| | 20 | −50 | 20 | −20 | | | | | | | | | | | | |
| | 50 | −60 | 50 | −20 | | | | | | | | | | | | |
| 4260 | 10 | −40 | 10 | −15 | 100 | −35 | 100 | −35 | 50 | 0 | 25 | P 20 | 10 | P 10 | 25 | −13 |
| | 25 | −40 | 25 | −15 | | | | | 100 | 0 | 50 | P 0 | 25 | P 40 | 50 | −47 |
| | 50 | −65 | 50 | −15 | | | | | | | 100 | P 0 | 50 | P 40 | 100 | −59 |
| | 100 | −95 | 100 | −30 | | | | | | | | | 100 | P 90 | | |
| 4416 | 5 | −60 | 5 | −10 | 20 | 0 | | | | | 5 | P 10 | 5 | P 10 | 5 | −5 |
| | 10 | −100 | 10 | −20 | | | | | | | 10 | P 10 | 10 | P 20 | 10 | 0 |
| | 25 | −10 | 25 | −10 | | | | | | | 25 | P 10 | 25 | P 10 | 25 | −22 |
| | 50 | −90 | 50 | −30 | | | | | | | 50 | P 10 | 50 | P 70 | 50 | −24 |
| | 100 | −95 | 100 | −10 | | | | | | | | | 100 | P 100 | | |
| 4310 | 5 | −30 | 5 | 0 | | | | | | | 25 | P 10 | 5 | P 0 | 25 | −26 |
| | 10 | −60 | 10 | −20 | | | | | | | 50 | P 30 | 10 | P 0 | 50 | 0 |
| | 25 | −10 | 25 | −10 | | | | | | | | | 25 | P 0 | | |
| | 50 | −50 | 50 | −10 | | | | | | | | | 50 | P 0 | | |
| 4261 | 5 | −40 | 5 | −10 | 50 | −50 | 100 | −75 | 50 | ↘ | 5 | P 0 | 5 | P 0 | 25 | −21 |
| | 10 | −60 | 10 | −20 | 100 | −45 | | | 100 | ↘ | 10 | P 0 | 10 | P 20 | 50 | −17 |
| | 25 | −70 | 25 | −15 | | | | | | | 25 | P 40 | 25 | P 60 | | |
| | 50 | −85 | 50 | −20 | | | | | | | | | 50 | P 100 | | |
| 4267 | 50 | 0 | 50 | 0 | 100 | N.S. | 100 | N.S. | 50 | 0 | 50 | P 20 | 50 | 0 | 50 | 0 |
| | 100 | 0 | 100 | 0 | | | | | 100 | 0 | 100 | P 20 | 100 | 0 | 100 | −15 |
| 4268 | 50 | 0 | 50 | 0 | 100 | 0 | 100 | 0 | 50 | 0 | 50 | P 15 | 50 | 0 | 50 | 0 |
| | 100 | 0 | 100 | 0 | | | | | 100 | 0 | 100 | P 20 | 100 | 0 | 100 | 0 |
| 4274 | 100 | 0 | 100 | 10 | | | | | | | 100 | 0 | 50 | 0 | 100 | 0 |
| | 50 | 20 | 50 | 10 | | | | | | | | | 100 | 0 | | |
| 4280 | 50 | −20 | 50 | −20 | | | 100 | 0 | | | 25 | 0 | 50 | 0 | 10 | −19 |
| | 100 | −10 | 100 | −10 | | | | | | | 50 | P 10 | 100 | 0 | 25 | −50 |
| | | | | | | | | | | | | | | | 50 | −44 |
| | | | | | | | | | | | | | | | 100 | −30 |
| 4281 | 50 | −20 | 50 | 0 | | | 50 | 0 | | | 100 | 0 | 50 | 0 | 100 | −18 |
| | 100 | −10 | 100 | 0 | | | 100 | −87 N.S. | | | | | 100 | 0 | | |
| 4403 | 20 | −30 | 20 | −30 | 20 | 0 | | | | | | | 20 | P 20 | | |
| | 50 | −40 | 50 | −10 | | | | | | | | | | | | |
| 4380 | 5 | −10 | 5 | 0 | | | | | | | 5 | 0 | 5 | 0 | 5 | −23 |
| | 10 | −50 | 10 | −10 | | | | | | | 10 | 0 | 10 | 0 | 10 | −20 |
| 4379 | 2.5 | −30 | 2.5 | 0 | 10 | −55 S. | | | | | 5 | 0 | 5 | 0 | 5 | 0 |
| | 5 | −40 | 5 | −20 | | | | | | | 10 | P 10 | 10 | 0 | 10 | −20 |
| | 10 | −40 | 10 | −10 | | | | | | | | | | | | |
| | 25 | −50 | 25 | −10 | | | | | | | | | | | | |
| | 50 | −60 | 50 | −20 | | | | | | | | | | | | |
| 4381 | 5 | −10 | 5 | 0 | | | | | | | 5 | 0 | 5 | 0 | 5 | −12 |
| | 10 | −10 | 10 | −10 | | | | | | | 10 | 0 | 10 | 0 | 10 | −22 |
| 4402 | 20 | −40 | 20 | −10 | 20 | 0 | | | | | | | 20 | 0 | | |
| | 50 | −80 | 50 | −20 | | | | | | | | | | | | |

S.=Significant; N.S.=Not significant.

(B) *Antiphlogistic activity.*—Certain of the products mentioned have an antiphlogistic activity which is particularly marked in compounds 4425 CB and 4426 CB.

These two compounds have been studied in their behaviour towards rats by means of various tests:
    Cotton granuloma test.
    Variation in the weight of the thymus of the animals.
    Variation in the weight of the suprarenals.
    Oedema of the paw in response to carragheenin.

These four tests were carried out on the same rats and the rats were compared with a group of control rats and with a group of rats treated with a product used for comparison, namely hydrocortisone acetate.

The two products 4425 and 4426 CB are administered orally for 5 consecutive days in a dose of 250 mg./kg./day. The first treatment is carried out on the day of implantation of the pellets of cotton under the skin of the rats.

Hydrocortisone is also administrated orally but in a dose of 50 mg./kg./day. The control rats are given the solvent for the products used (5% gum in water).

On the day of the last treatment, the rats are given an injection of carragheenin under the plantar aponeurosis of the right posterior paw. The paws are measured before the injection of carragheenin and then 3 hours and 24 hours later.

On the day following the last treatment, the rats are sacrificed. The suprarenals, the thymus glands and the granulomata formed round the pellets of cotton are removed and weighed (after drying).

Results: The results summarised in the following table are expressed in percent based on the controls and the coefficient (t) is calculated to find out whether the figures are significant.

TABLETS

Example A:
   7 - chloro - 5 - (1' - cyclohexenyl)- 2 - oxo - 2,3 - dihydro-1H-benzo[f]diazepine-1,4 (4260 CB) ___   50 mg.
   Excipient _____ Q.s. for a tablet.

Example B:
   1,7 - dichloro - 5 - phenyl - 2 -oxo- 2,3 - dihydro 1H - benzo[f]diazepine-1,4 (4254 CB) _____   10 mg.
   Excipient _____ Q.s. for a tablet.

Example C:
   7 - chloro - 5 - (1' - cyclohexenyl)- 1 - methyl - 2 - oxo - 2,3 - dihydro 1H - benzo[f]diazepine - 1,4 (4261 CB) _____   50 mg.
   Excipient _____ Q.s. for a tablet.

Example D:
   7 - chloro - 5 - trichloromethyl - 2- oxo - 2,3 - dihydro 1H-benzo[f]diazepine-1,4 (4426 CB) _____   50 mg.
   Excipient _____ Q.s. for a tablet.

The tablets may be prepared by the usual method of double compression or granulation employing an aqueous gum solution or a non-aqueous solvent such as ethyl alcohol. The excipients used may be, for example, starch, talcum, gum arabic, magnesium stearate or carboxymethyl cellulose. The tablets may be made suitable for intestinal absorption by glutinisation or by coating with a substance resistant to the action of the gastric juices, for example cellulose acetophthalate, in order to prevent the gastric hydrochloric acid acting on the active principle as well as in order to prevent any possible sub-

TABLE

| Product | Total dose received | Weight of granulomata | | Weight of thymus glands | | Weight of suprarenals | | Oedema with carragheenin | | | |
|---|---|---|---|---|---|---|---|---|---|---|---|
| | | | | | | | | 3 hours | | 24 hours | |
| | | Per 100 of controls | (t) | Per 100 of controls | (t) | Per 100 of controls | (t) | Per 100 of controls | (t) | Per 100 of controls | (t) |
| 4425 | 1.25 g./kg. | −6.8 | 1.44 | −1.5 | 0.15 | +3.4 | 0.81 | −52.2 | 2.87 | −19.4 | 0.9 |
| 4426 | 1.25 g./kg. | −20.8 | 5.09 | −31 | 3.12 | +8.2 | +.92 | −44.6 | 3.13 | +25.- | ---- |
| Hydrocortisone acetate | 0.25 g./kg. | −23.4 | 5.72 | −62.2 | 8.64 | −15.4 | 13.8 | −56.6 | 3.46 | −40.4 | 2.5 |

On examination of the results obtained, it is found:

(1) that compounds 4254 CB and 4289 CB are of particular interest for their sedative action on the central nervous system;

(2) that compounds 4260 CB, 4261 CB, 4416 CB and 4379 CB are of particular interest for their action on the central nervous system and for their myorelaxant effect; and (3) that compounds 4425 CB and 4426 CB are of particular interest as antiphlogistic agents.

On account of their sedative properties, especially on the central nervous system, the compounds listed under 1 and 2 may be used therapeutically in pathalogical states such as states of agitation, irritability, aggressiveness and insomnia, neurotic and psychotic states and in certain psychosomatic syndromes, certain character and behaviour defects and certain muscular spasms or contractures.

Compounds 4425 CB and 4426 CB may be used therapeutically for their antiphlogistic properties in diseases responding to such an action, such as rheumatic diseases.

The compounds according to the invention may be used in admixture with other pharmacologically active substances such as central analgesics, spasmolytics, antiulcerative agents, hypnotics and cardiac sedatives.

The pharmaceutical preparations containing the products of the invention may be so formulated that the product can be administered in a quantity of the order of 0.5 mg. to 200 mg. Typical preparations are described below by way of example.

sequent gastric troubles. The tablets may or may not be coated with an opaque sugar coating which may, if desired, be coloured.

I claim:

1. A 5-substituted benzodiazepine having the formula $$\begin{array}{c} R_2 \ O \\ | \ \| \\ N-C \\ R_4-\bigcirc\bigcirc \quad \diagdown \\ \quad\quad\quad CHR_3 \\ \quad\quad\quad\diagup \\ \quad\quad C=N \\ \quad\quad | \\ \quad\quad R_1 \end{array}$$

in which $R_1$ is selected from the group consisting of phenyl, lower alkenyl, α-cycloalkenyl having 5–6 carbon atoms, and a group having the formula $$R_5-\underset{\underset{R_6}{|}}{\overset{|}{C}}-R_7$$

in which $R_5$ and $R_6$ individually is each selected from the group consisting of hydrogen, chlorine and lower alkyl, or $R_5$ and $R_6$ collectively with the carbon atom to which they are attached represent cycloalkyl having 5–6 carbon atoms, and $R_7$ is selected from the group consisting of hydrogen and chlorine; $R_2$ is selected from the group consisting of chlorine, hydrogen and lower alkyl, with the provisos that at least one of $R_2$, $R_5$, $R_6$ and $R_7$ is chlorine and that $R_2$ is chlorine when $R_1$ is phenyl; $R_3$ is selected from the group consisting of hydrogen and lower alkyl;

and $R_4$ is selected from the group consisting of hydrogen, halogen, lower alkyl, lower alkoxy, trifluoromethyl, and nitro.

2. A benzodiazepine as claimed in claim 1 in which $R_1$ is α-cycloalkenyl having 5–6 carbon atoms.

3. A benzodiazepine as claimed in claim 1 in which $R_4$ is selected from the group consisting of chlorine and nitro.

4. A benzodiazepine as claimed in claim 1 in which $R_1$ is phenyl, $R_2$ is a chlorine atom, $R_3$ is a hydrogen atom and $R_4$ is a chlorine atom in the 7-position.

5. A benzodiazepine as claimed in claim 1 in which $R_1$ is phenyl, $R_2$ is a chlorine atom, $R_3$ is methyl and $R_4$ is a chlorine atom in the 7-position.

6. A benzodiazepine as claimed in claim 1 in which $R_1$ is dichloromethyl, $R_2$ is a hydrogen atom, $R_3$ is a hydrogen atom and $R_4$ is a chlorine atom in the 7-position.

7. A benzodiazepine as claimed in claim 1 in which $R_1$ is trichloromethyl, $R_2$ is a hydrogen atom, $R_3$ is a hydrogen atom and $R_4$ is a chlorine atom in the 7-position.

8. A benzodiazepine as claimed in claim 1 in which $R_1$ is α-cyclohexenyl, $R_2$ is a hydrogen atom, $R_3$ is a hydrogen atom and $R_4$ is a chlorine atom in the 7-position.

9. A benzodiazepine as claimed in claim 1 in which $R_1$ is 1-chlorocyclohexyl, $R_2$ is a hydrogen atom, $R_3$ is a hydrogen atom and $R_4$ is a chlorine atom in the 7-position.

10. A benzodiazepine as claimed in claim 1 in which $R_1$ is α-cyclohexenyl, $R_2$ is a methyl group, $R_3$ is a hydrogen atom and $R_4$ is a chlorine atom in the 7-position.

11. A benzodiazepine as claimed in claim 1 in which $R_1$ is α-cyclohexanyl, $R_2$ is a hydrogen atom, $R_3$ is a hydrogen atom and $R_4$ is a nitro group in the 7-position.

12. A process for the production of a 5-substituted benzodiazepine having the formula

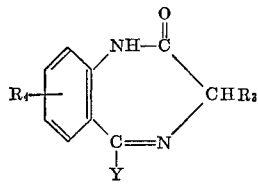

in which $R_3$ and $R_4$ are as defined in claim 11 and Y is selected from the group consisting of lower α-alkenyl and α-cycloalkenyl having 5–6 carbon atoms which comprises producing by the process of claim 11 a C-monochlorobenodiazepine in which $R_2$ is hydrogen, $R_1$ is a group having the formula

in which at least one of $R_5$ and $R_6$ is lower alkyl or $R_5$ and $R_6$ collectively with the carbon atom to which they are attached represent cycloalkyl having 5–6 carbon atoms, one of $R_5$, $R_6$ and $R_7$ is a chlorine atom, and then heating the said C-monochlorobenzodiazepine with a dehydrohalogenating agent.

13. A process for the production of 1-alkyl-5-substituted benzodiazepine having the formula

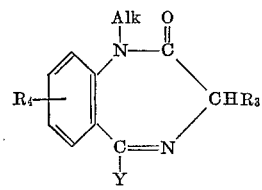

in which $R_3$ and $R_4$ are as defined in claim 11, Y is selected from the group consisting of lower α-alkenyl and α-cycloalkenyl having 5–6 carbon atoms, Alk is lower alkyl, which comprises (a) producing by the process of claim 11 a C-monochlorobenzodiazepine in which $R_2$ is hydrogen, $R_1$ is a group having the formula

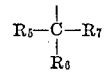

in which at least one of $R_5$ and $R_6$ is lower alkyl or $R_5$ and $R_6$ collectively with the carbon atom to which they are attached represent cycloalkyl having 5–6 carbon atoms, and one of $R_5$, $R_6$ and $R_7$ is a chlorine atom, (b) heating the said C-monochlorobenzodiazepine with a dehydrohalogenating agent, and (c) alkylating the reaction product of step (b) with an alkyl halide in the presence of an alkali metal alkoxide.

14. A process for producing a chlorobenzodiazepine having the formula

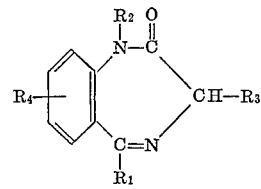

in which $R_1$ is selected from the group consisting of phenyl and a group having the formula

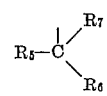

in which $R_5$ and $R_6$ individually is each selected from the group consisting of hydrogen, chlorine and lower alkyl, or $R_5$ and $R_6$ collectively with the carbon atom to which they are attached represent cycloalkyl having 5–6 carbon atoms, $R_7$ is selected from the group consisting of hydrogen and chlorine, $R_2$ is selected from the group consisting of hydrogen and chlorine, $R_4$ is selected from the group consisting of hydrogen, halogen, lower alkyl, lower alkoxy, trifluoromethyl, and nitro, with the provisos that at least one of $R_2$, $R_5$, $R_6$ and $R_7$ is chlorine, and when $R_2$ is chlorine $R_1$ is phenyl, and $R_3$ is selected from the group consisting of hydrogen and lower alkyl, which comprises treating a benzodiazepine having the formula

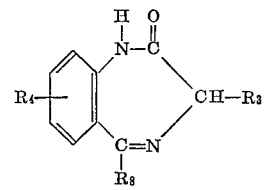

in which $R_3$ and $R_4$ are as above defined and $R_8$ is selected from the group consisting of phenyl and a group having the formula

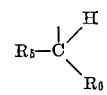

in which $R_5$ and $R_6$ are as above defined, with a hypochlorite.

15. The process of claim 14 in which $R_3$ is a hydrogen atom, $R_4$ is a chlorine atom in the 7-position and $R_8$ is phenyl.

16. The process of claim 14 in which $R_3$ is methyl, $R_4$ is a chlorine atom in the 7-position and $R_8$ is phenyl.

17. The process of claim 14 in which $R_3$ is a hydrogen atom, $R_4$ is a chlorine atom in the 7-position and $R_8$ is methyl, the hypochlorite being used in an amount sufficient to introduce two chlorine atoms into the methyl group.

18. The process of claim 14 in which $R_3$ is a hydrogen atom, $R_4$ is a chlorine atom in the 7-position and $R_8$ is methyl, the hypochlorite being used in an amount sufficient to introduce three chlorine atoms into the methyl group.

19. The process of claim 14 in which $R_3$ is a hydrogen atom, $R_4$ is a chlorine atom in the 7-position and $R_8$ is cyclohexyl, the hypochlorite being used in an amount sufficient to introduce one chlorine atom into the cyclohexyl group.

20. The process of claim 14 in which $R_3$ is a hydrogen atom, $R_4$ is a nitro group in the 7-position and $R_8$ is cyclohexyl, the hypochlorite being used in an amount sufficient to introduce one chlorine atom into the cyclohexyl group.

21. The process of claim 12 in which $R_3$ is a hydrogen atom, $R_4$ is a chlorine atom in the 7-position and $R_5$ and $R_6$ collectively with the carbon atom to which they are attached represent cyclohexyl.

22. The process of claim 12 in which $R_3$ is a hydrogen atom, $R_4$ is nitro in the 7-position and $R_5$ and $R_6$ collectively with the carbon atom to which they are attached represent cyclohexyl.

23. The process of claim 13 in which $R_3$ is a hydrogen atom, $R_4$ is a chlorine atom in the 7-position, $R_8$ is cyclohexyl, and the alkyl halide is a methyl halide.

24. A process for the production of a 5-cycloalkylidene benzodiazepine having the formula

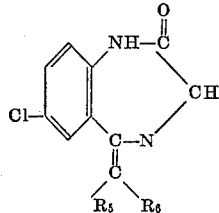

in which $R_5$ and $R_6$ taken together with the carbon atom to which they are attached represent cycloalkylidene having 5–6 carbom atoms, which comprises producing by the process claimed in claim 14 a C-monochlorobenzodiazepine in which $R_2$ is a hydrogen atom, $R_3$ is a hydrogen atom, $R_4$ is a chlorine atom in the 7-position, $R_5$ and $R_6$ together with the carbon atom to which they are attached represent cycloalkyl having 5–6 carbon atoms, and $R_7$ is a chlorine atom, and then treating said C-monochlorobenzodiazepine with a dialkylamine in which each alkyl group contains at least two carbon atoms.

References Cited

UNITED STATES PATENTS

| 3,179,656 | 4/1965 | Berger et al. | 260—239.3 |
| 3,268,586 | 8/1966 | Berger et al. | 260—239.3 |

FOREIGN PATENTS

| 1,391,752 | 2/1965 | France. |

HENRY R. JILES, *Primary Examiner.*

R. T. BOND, *Assistant Examiner.*

U.S. Cl. X.R.

424—244

UNITED STATES PATENT OFFICE
CERTIFICATE OF CORRECTION

Patent No. 3,426,014                          February 4, 1969

Josef Schmitt

It is certified that error appears in the above identified patent and that said Letters Patent are hereby corrected as shown below:

Column 19, lines 45 and 48, claim reference numeral "11", each occurrence, should read -- 14 --; line 72, claim reference numeral "11", should read -- 14 --. Column 20, line 1, claim reference numeral "11" should read -- 14 --. Column 19, line 49, "chlorobenodiazepine" should read -- chlorobenzodiazepine --.

Signed and sealed this 8th day of December 1970.

(SEAL)
Attest:

Edward M. Fletcher, Jr.                      WILLIAM E. SCHUYLER, JR.
Attesting Officer                               Commissioner of Patents